Sept. 7, 1937.  B. LOEFFLER  2,092,175
RECIPROCAL VALVE OPERATING MECHANISM FOR DIESEL ENGINE AIR CHAMBERS
Filed Oct. 1, 1935  8 Sheets-Sheet 1

INVENTOR.
Bruno Loeffler,
BY Hogue, Neary & Campbell
HIS ATTORNEYS

Sept. 7, 1937.  B. LOEFFLER  2,092,175
RECIPROCAL VALVE OPERATING MECHANISM FOR DIESEL ENGINE AIR CHAMBERS
Filed Oct. 1, 1935  8 Sheets-Sheet 2
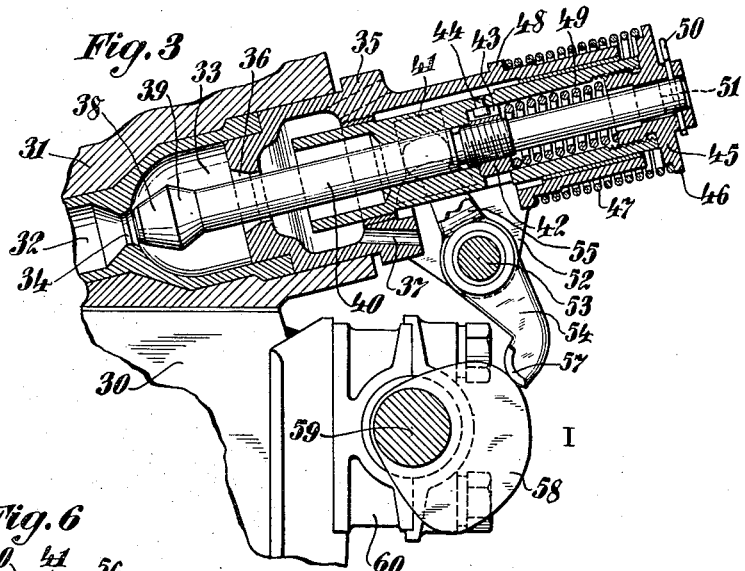
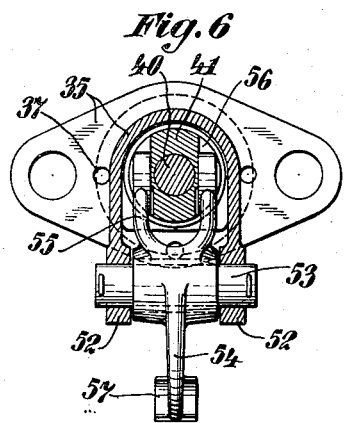
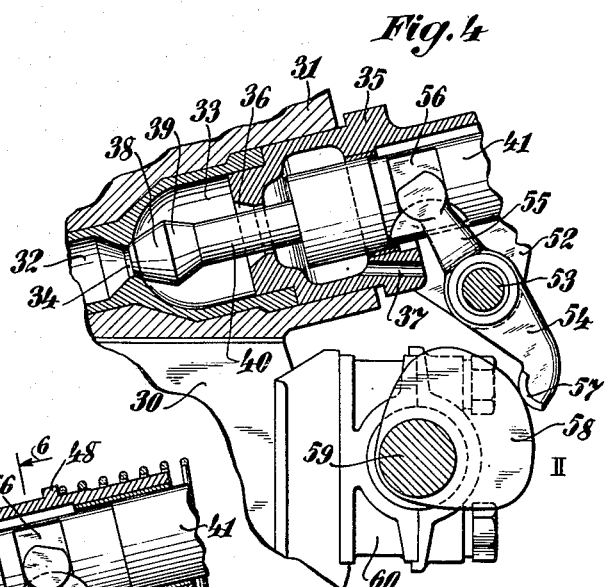
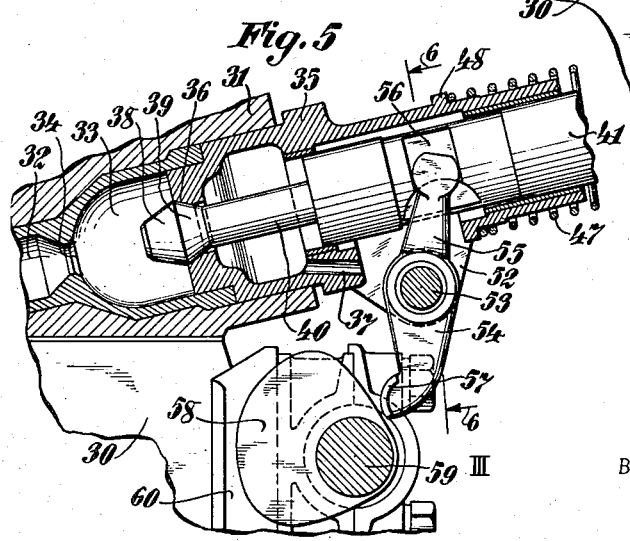
INVENTOR.
Bruno Loeffler,
BY Hoquet, Neary & Campbell,
HIS ATTORNEYS

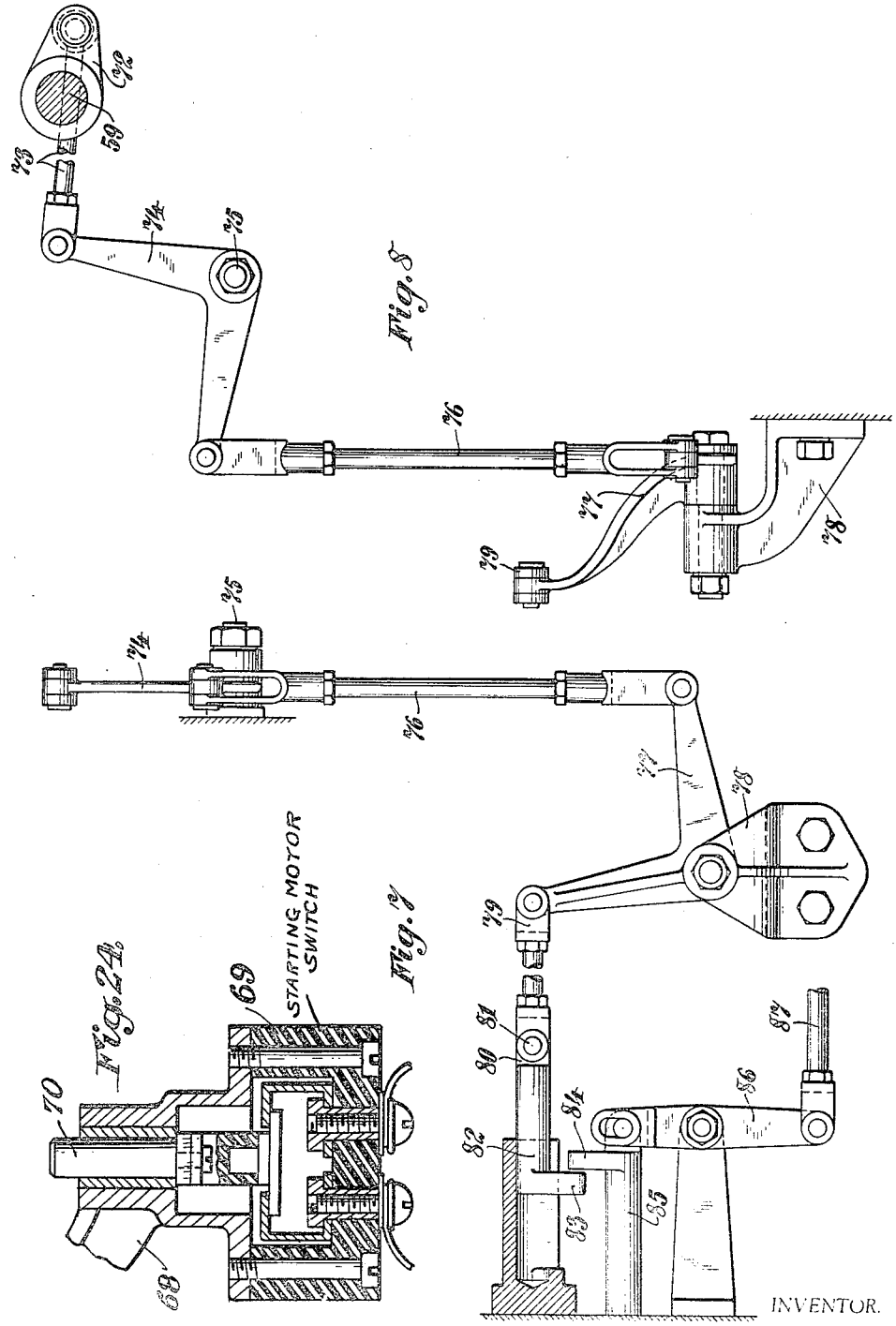

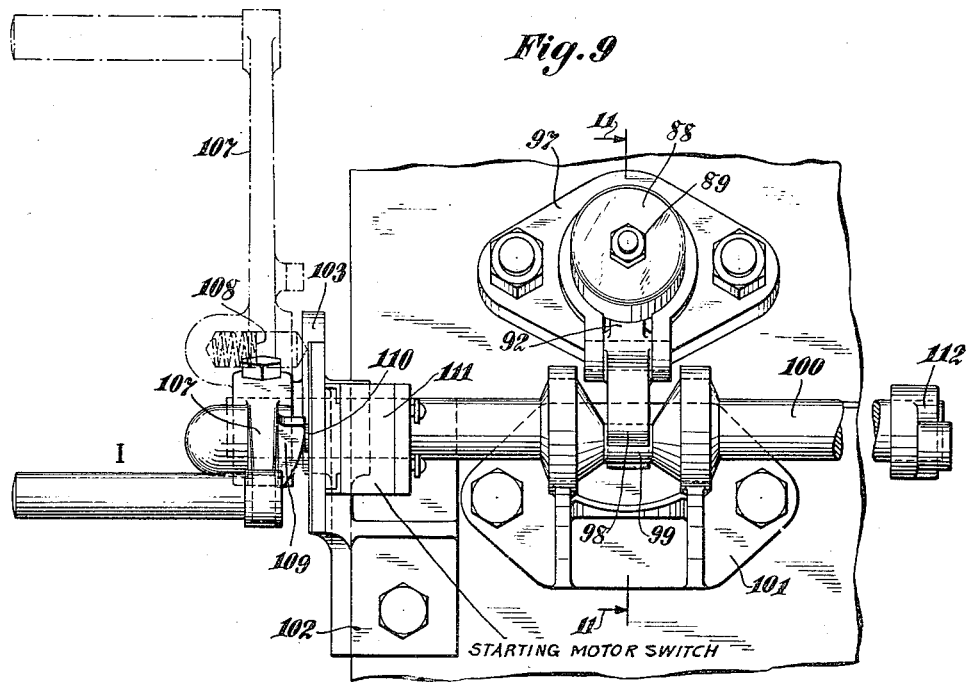
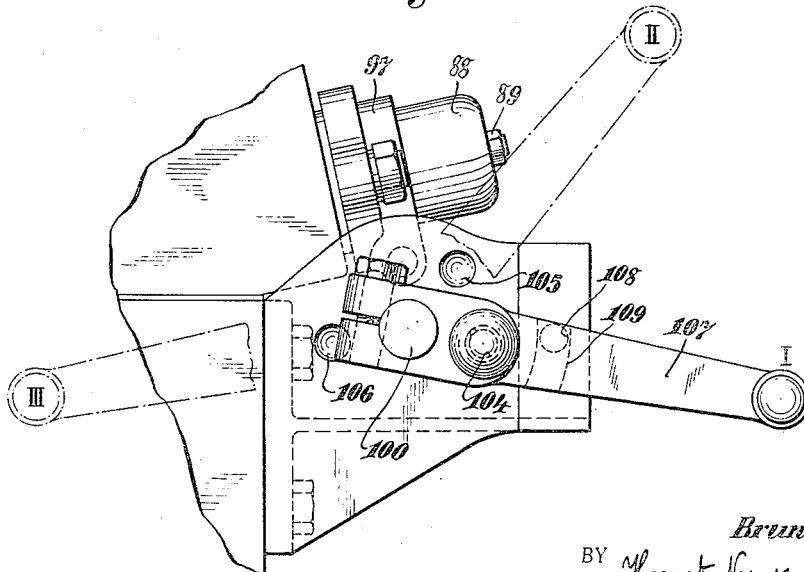

Sept. 7, 1937.  B. LOEFFLER  2,092,175
RECIPROCAL VALVE OPERATING MECHANISM FOR DIESEL ENGINE AIR CHAMBERS
Filed Oct. 1, 1935   8 Sheets-Sheet 5
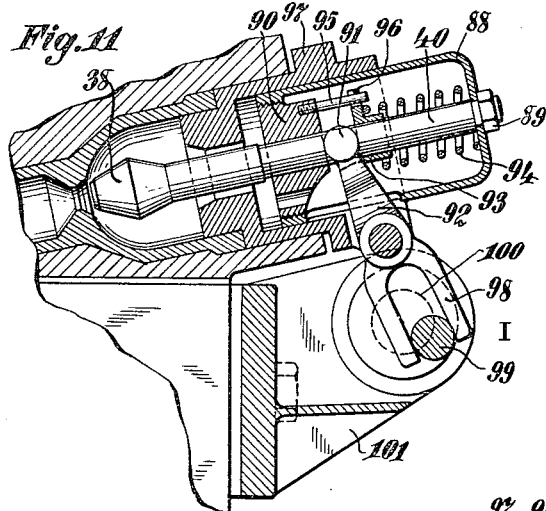
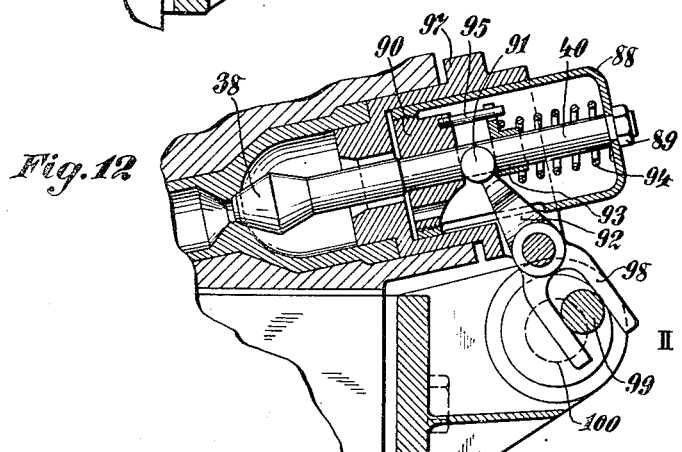
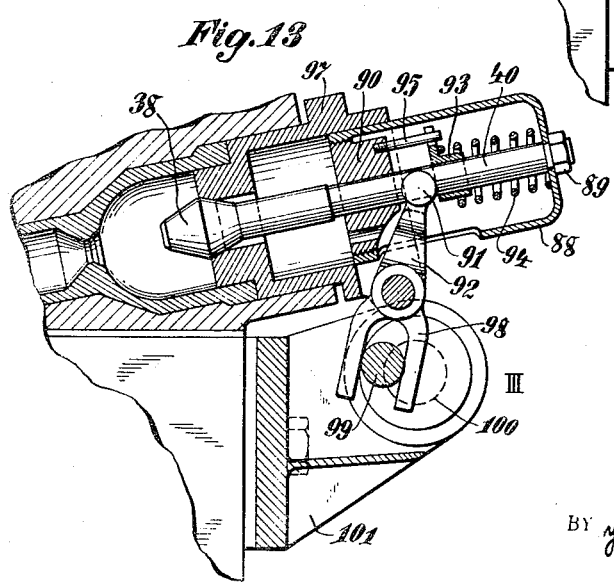
INVENTOR.
Bruno Loeffler,
BY Hoguet, Neary + Campbell,
HIS ATTORNEYS

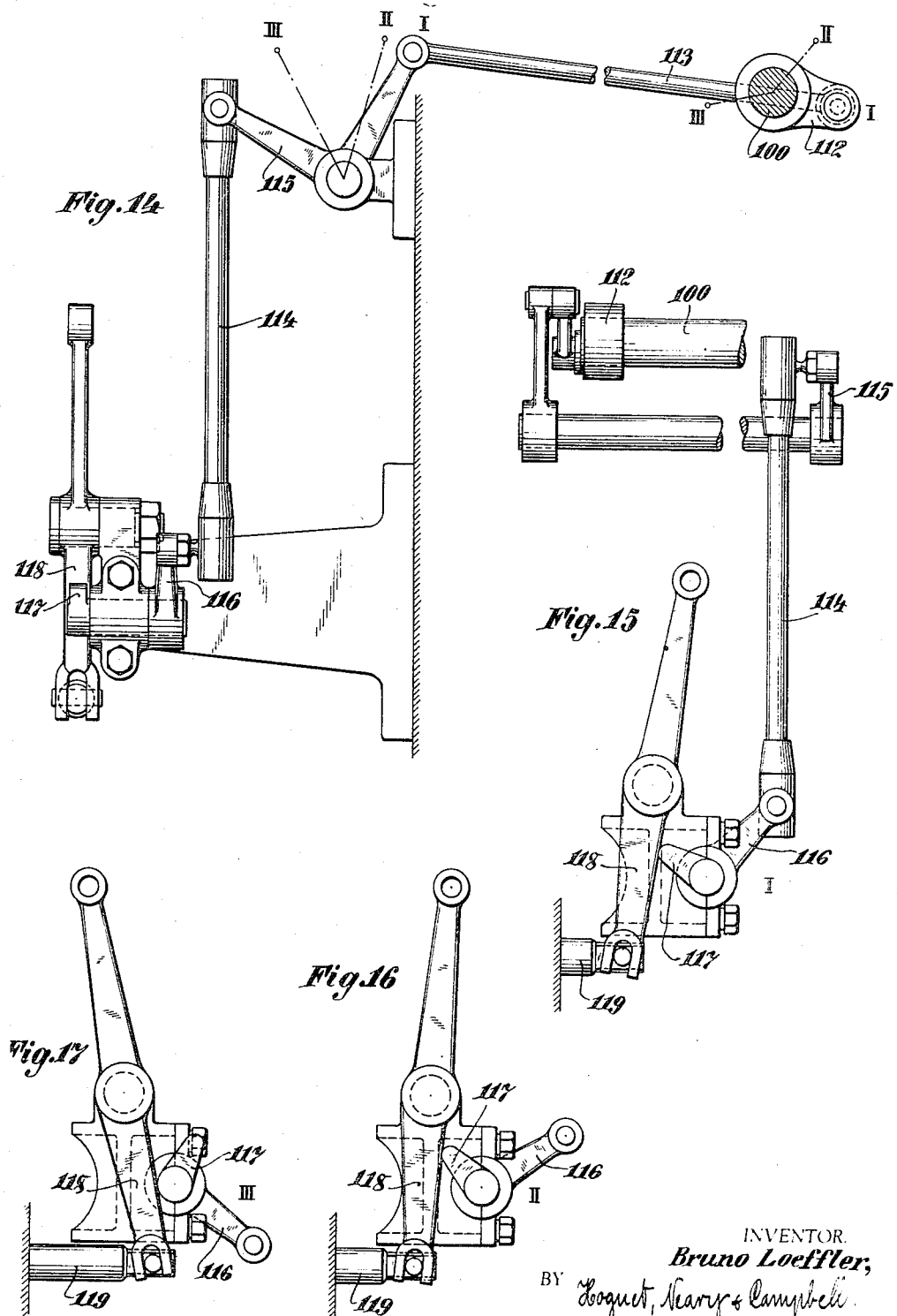

Sept. 7, 1937.  B. LOEFFLER  2,092,175
RECIPROCAL VALVE OPERATING MECHANISM FOR DIESEL ENGINE AIR CHAMBERS
Filed Oct. 1, 1935  8 Sheets-Sheet 7
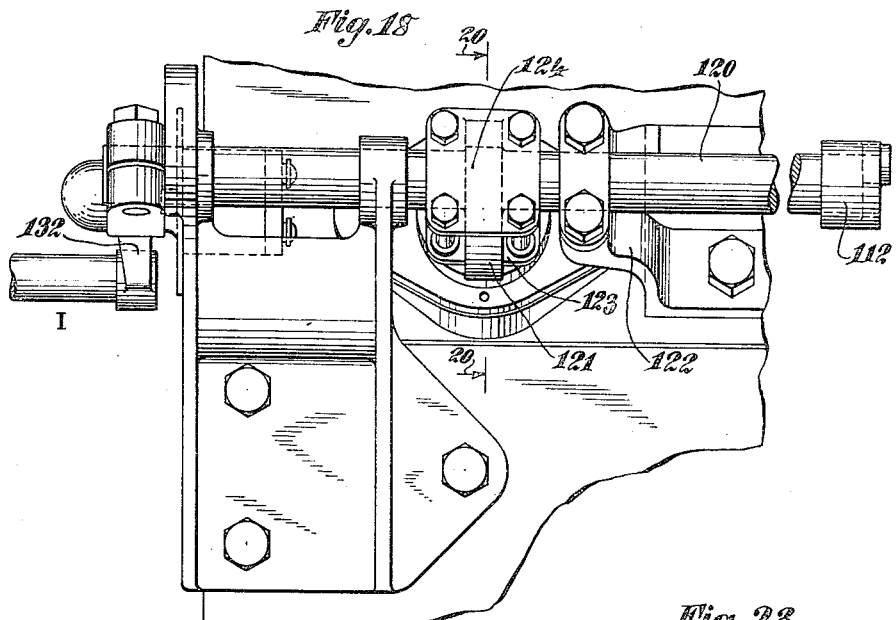
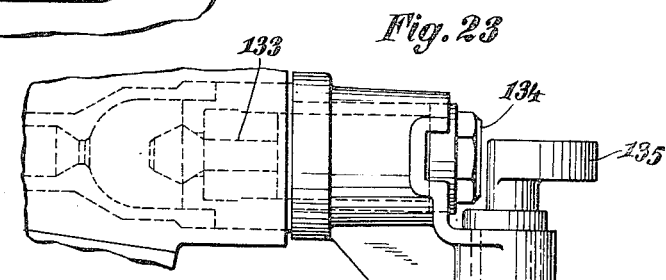
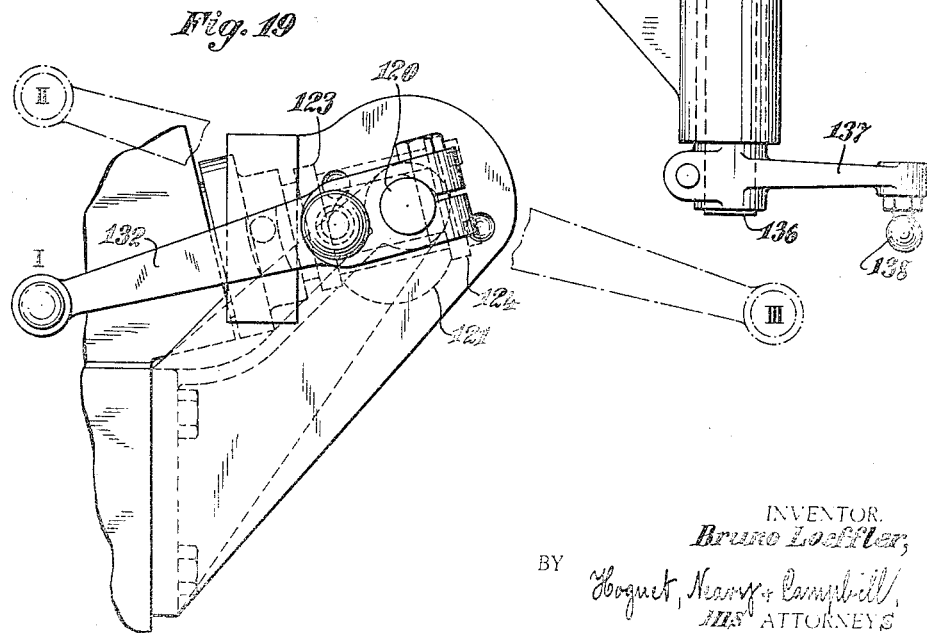
INVENTOR.
Bruno Loeffler
BY Hoguet, Neary & Campbell
HIS ATTORNEYS

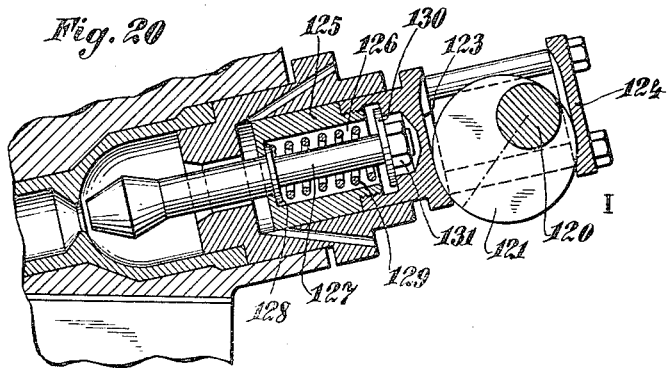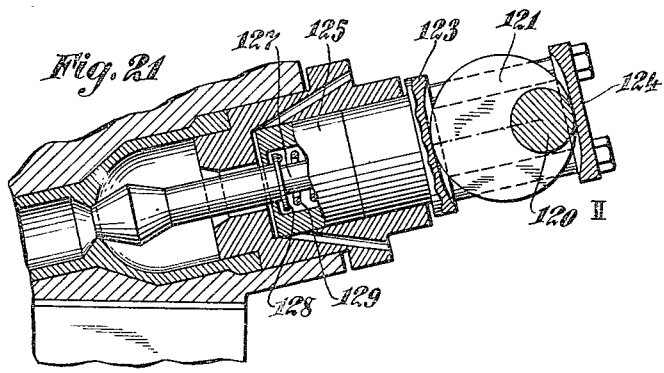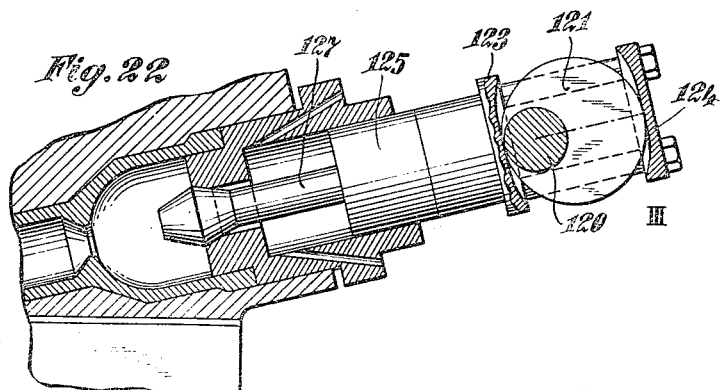

Patented Sept. 7, 1937

2,092,175

UNITED STATES PATENT OFFICE 2,092,175

RECIPROCAL VALVE OPERATING MECHANISM FOR DIESEL ENGINE AIR CHAMBERS

Bruno Loeffler, Plainfield, N. J., assignor to International Motor Company, New York, N. Y., a corporation of Delaware Application October 1, 1935, Serial No. 43,022

3 Claims. (Cl. 123—48)

The present invention relates to devices for controlling the operation of Diesel engines and embodies, more specifically, mechanism for operating the valve or valves by means of which the air and combustion chambers of certain types of Diesel engines may be caused to function properly in accordance with predetermined stages of operation of Diesel engines.

More particularly, the invention embodies an operating mechanism for the valve of a Diesel engine, the head of which is provided with air and combustion chambers between which a communicating passage is formed. A further passage is provided between the air chamber and the external atmosphere in order to provide communication therebetween under predetermined conditions, the valve mechanism being formed to close either of the passages selectively and also being adapted to be positioned in an intermediate position in which neither of the passages is closed in order that compression may be relieved during the cranking operation of the engine. After the cranking has been accomplished, the valve is moved to a position wherein the passage between the air and combustion chambers is closed, thus causing substantial compression to be created in the combustion chamber in order that the starting of the engine may be accomplished effectively. Following the starting stage in the operation of the engine, the valve is moved to close the passage between the air chamber and the external atmosphere in order that the air chamber may function in connection with the combustion chamber in accordance with known Diesel engine practice.

In accordance with the present invention, it is proposed to provide an improved form of mechanism by means of which the foregoing operation of one or more of the valves may be accomplished from a position comparatively remote from the engine.

A further object of the invention is to provide a valve operating mechanism of the above character wherein the control of the starting motor and fuel pump is effected in such fashion as to prevent operation of such elements during the stages of operation of the engine wherein the operation of such elements are not required.

A further object of the invention is to provide a valve operating mechanism of the above character by means of which a plurality of valves are operated simultaneously, each of the valves being fully and effectively controlled in order that it may function properly.

A further object of the invention is to provide an improved valve operating mechanism of the above character, the elements of which adapt the mechanism to be manufactured, assembled and serviced with facility, the operating elements being so related that, during operation of the engine, the parts function effectively regardless of the severity of the conditions under which such operation takes place.

Further objects and advantages of the invention will be apparent as it is described in further detail in connection with the accompanying drawings, wherein Figure 1 is a view in side elevation, showing a portion of a Diesel engine upon which valve mechanism has been mounted in accordance with the present invention;

Figure 3 is a view in section, taken on the line 3—3 of Figure 1, and looking in the direction of the arrows, this view illustrating the mechanism when the elements thereof are moved to cranking position;

Figure 4 is a view similar to Figure 3 showing the elements moved into a starting position;

Figure 5 is a view similar to Figure 3, showing the elements moved into running position;

Figure 6 is a view in section, taken on the line 6—6 of Figure 5, and looking in the direction of the arrows;

Figure 7 is a detail view showing the operating connection between the valve operating mechanism and the fuel pump control;

Figure 8 is a view in end elevation, showing the elements of Figure 7;

Figure 9 is a view similar to Figure 1, showing a modified form of the invention;

Figure 10 is a view in end elevation, showing the elements of Figure 9;

Figure 11 is a view similar to Figure 3, showing the valve and operating mechanism therefor moved into cranking position;

Figure 12 is a view similar to Figure 4 showing the elements moved into starting position;

Figure 13 is a view similar to Figure 5, showing the elements moved into running position;

Figure 14 is a view in end elevation, showing the mechanism by means of which motion of the valve operating shaft is transmitted to the oil interlocking mechanism which controls the fuel pump;

Figure 15 is a view in side elevation, showing the elements of Figure 14, this view illustrating the position of the elements during cranking operation;

Figure 16 is a view similar to Figure 15, showing the interlock moved to starting position;

Figure 17 is a view similar to Figure 15, showing the elements moved to running position;

Figure 18 is a view similar to Figure 1 showing a further modified form of the invention;

Figure 19 is a view in end elevation, showing the elements of Figure 18;

Figure 20 is a view in section, similar to Figure 3, and showing the elements of Figure 18 in cranking position;

Fig. 21 is a view similar to Figure 4, showing the elements of Figure 18 in starting position;

Figure 22 is a view similar to Figure 5, showing the elements of Figure 18 in running position; and Figure 23 is a view similar to Figure 2, showing a still further modification of the invention.

Figure 1:
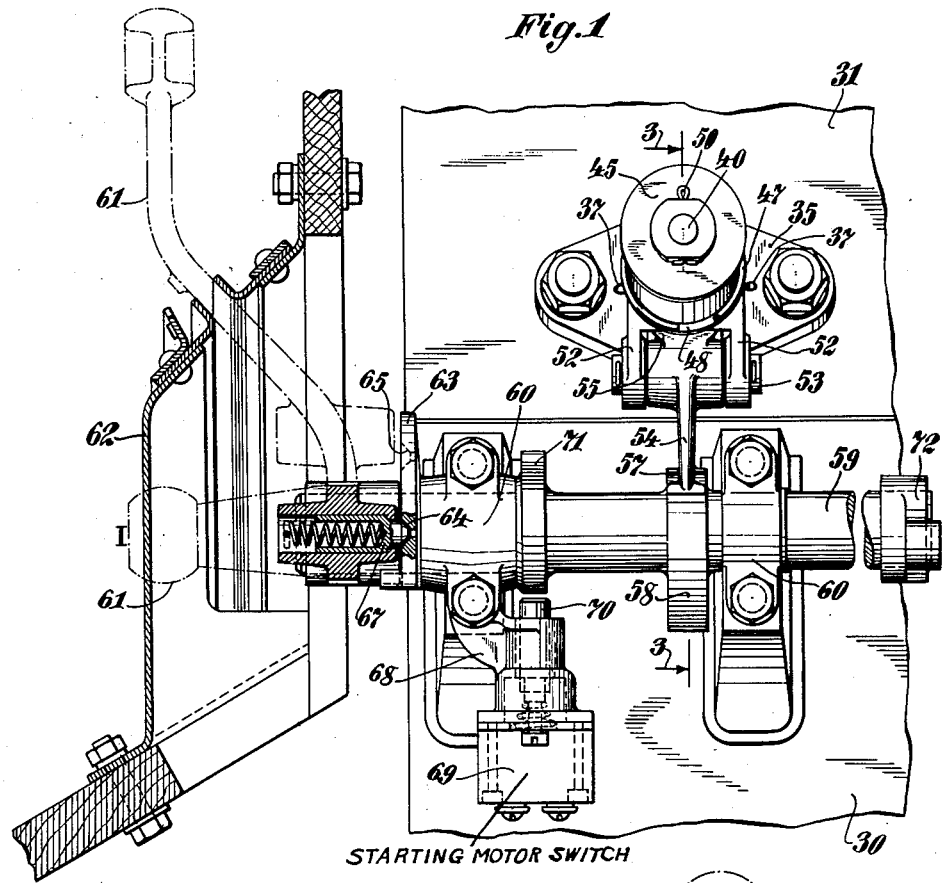

Figure 24 is a diagrammatic view showing the switch 69 and 111 indicated in Figures 1 and 9.

With reference to the drawings, and particularly to Figures 1 through 8, an engine is shown as being provided with a block 30 upon which a head 31 is mounted. The head is formed with a combustion chamber 32 and an air chamber 33, a passage 34 communicating therebetween. Air chamber 33 is closed by a fitting 35 within which a central passage 36 is formed, the fitting being formed with passages 37 by means of which communication is established between the external atmosphere and the air chamber 33. Valves 38 and 39 are adapted to close passages 34 and 36, respectively, passage 34 being closed during the starting phase of the engine, while passage 36 is closed during the running stage thereof. When the valves 38 and 39 are in the position shown in Figure 3, the engine is adapted to be cranked inasmuch as the compression within the combustion chamber 32 is destroyed because of the communication of such chamber with the external atmosphere through passages 34, 36 and 37. Valves 38 and 39 are provided with a stem 40 which is slidably mounted on a sleeve 41 and provided with a collar 42 which is secured to the stem. The collar 42 is formed with a guide slot 43 in which a guide pin 44 engages in order that the valves 38 and 39 may be properly seated during operation of the engine. Sleeve 41 is provided with a cover plate 45 which is threaded into the end thereof and is provided with a peripheral flange 46 against which a spring 47 is adapted to engage. Spring 47 is seated upon a flange 48 which is formed upon the fitting 35, fitting 35 being provided with a bore in which the sleeve 41 slides.

A spring 49 is provided within the sleeve 41 and is seated against the inner extremity of the cover 45, the other end of the spring bearing against the collar 42. A cotter pin 50 is received by the cover plate 45 and passes through an elongated slot 51 in the stem 40 in order to accommodate relative motion between the valve stem 40 and the sleeve 41.

It will thus be seen that axial motion of the sleeve 41 to the left, as viewed in Figure 3, causes the valve 38 to close the passage 34, final closing motion thereof being accomplished by compression of the spring 49 as provided by the lost motion connection afforded by the slot 51 and cotter pin 50. This position of the elements is illustrated in Figure 4.

Motion of the sleeve 41 to the right, as viewed in Figure 3, results in valve 39 closing passage 36 with the yielding force supplied by spring 47. This position of the elements is illustrated in Figure 5.

Fitting 35 may be formed with spaced plates 52 between which a pin 53 may be secured. A lever 54 is journaled on the pin 53 and provided with a bifurcated extremity 55 which engages suitably formed recesses 56 in the opposite sides of the sleeve 41. The opposite end of lever 54 is formed with a cam follower 57 which engages a cam 58 carried by a valve operating shaft 59. Shaft 59 is shown as being journaled in a bearing 60 carried by the cylinder block of the engine. Obviously, the shaft may be mounted upon the head, being sectionalized in accordance with the number and spacing of the head sections.

Figure 2:
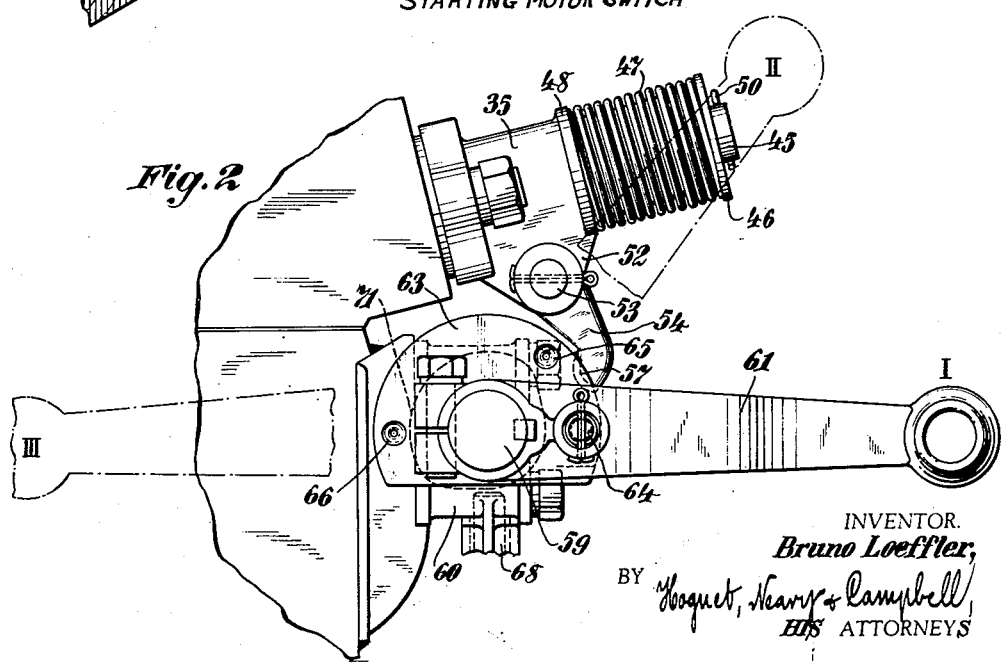
Figure 2 is a view in end elevation looking from the left in Figure 1, and showing the elements of Figure 1.

As shown in Figures 1 and 2, the shaft 59 has secured to one end thereof an operating member 61 which may extend through a partition member 62 in order that the shaft may be conveniently operated. In this connection, the bearing 60 adjacent the end of the shaft is provided with a plate 63 formed with a plurality of apertures 64, 65 and 66. A spring pressed detent 67 is carried by the lever 61 and is adapted to engage the recesses 64, 65 and 66 in order that the mechanism may be located properly to effect proper operation of the engine. For example, when the detent 67 is in the recess 64, as shown in Figure 2, the valves 38 and 39 are in the position shown in Figure 3. This position is indicated by the roman numeral I and corresponds throughout the entire description of the invention to the position in which cranking of the engine is effected. When the lever is in the position indicated by the dot and dash lines and roman numeral II, the detent 67 engages recess 65 and valve 38 closes passage 34. This is the starting position of the engine.

When the lever 61 is moved to the position shown in dot and dash lines and indicated by the roman numeral III in Figure 2, valve 39 closes passage 36 and the valve is in normal running position.

Also carried by the bearing 60 adjacent the lever 61 is a downwardly extending bracket 68 upon which a switch housing 69 is mounted. The switch housing contains a switch which is operated by a plunger 70 and a cam 71 upon the shaft 59. During the cranking position shown in Figures 1 and 2, the switch is closed in order that the starting motor may operate. As the shaft 59 is moved into the positions indicated by roman numerals II and III, the cam 71 engages the plunger 70 and opens the circuit of the starting motor switch, thus preventing operation of the starting motor during the starting and running positions of the valve.

It will be observed that the lost motion connection afforded by the slot 51 is such that the valve is positively seated in the position indicated by roman numeral II by the cam 58 while being yieldingly seated in the position indicated by the roman numeral III (to close passage 36) by the spring 47. A further advantage of the present construction resides in the fact that the springs 47 and 49, together with the coacting elements, are spaced away from the head and thus are relatively remote from the hottest points of the engine. The formation of the cams 58 is such that a rapid rise against the follower 57 occurs to seat the valve 38 effectively in closed position. Shaft 59 also carries an arm 72 which is connected to a link 73, pivotally connected to one end of a bell crank lever 74. Lever 74 is journaled upon a stationary part of the engine at 75 and the other end thereof is hingedly connected to a link 76 which is in turn connected to one arm of a bell crank lever 77, journaled upon a bracket 78. The other end of the lever 77 is offset and connected to a link 79 which is pivoted to the fuel pump interlock actuator 80 at 81. The fuel pump actuator 80 may consist of a locking rod 82 having an arm 83 projecting into the path of an arm 84 carried by a fuel pump control member 85. The fuel pump control rod 85 is operated by means of a lever 86 which may be suitably connected to the foot pedal or other manual control member as by means of the link 87.

Obviously, the arm 72 is so positioned that the arm 83 lies in the path of arm 84 to prevent operation of the fuel pump when the valves 38 and 39 are in the intermediate position shown in Figure 3. It thus becomes impossible to introduce fuel into the engine during the cranking operation.

In the form of the invention shown in Figures 9 through 17, the valve stem 40 is provided with a cage 88, being secured thereto by means of a bolt 89. This cage is provided with a head 90 against which the bifurcated end 91 of lever 92 engages. A head 93 is slidable upon the stem 40 and is normally urged against the bifurcated end 91 of lever 92 by means of compression spring 94, a pin 95 being carried by head 90 to engage a recess 96 in the head 93 in order that the elements may be maintained in proper operative position. The cage 88 is slidable in a fitting 97 and thus enables the valve 38 to be seated positively by the lever 92. To effect such motion of the valve, lever 92 is provided with a second bifurcated arm 98 which engages a crank 99 formed on a crank shaft 100. The shaft 100 is journaled in brackets 101 and the end of the shaft may be journaled in a bracket 102 upon which plate 103 is formed. This plate is provided with recesses 104, 105 and 106 which are similar in function to the recesses 64, 65 and 66. An operating arm 107 is secured to the end of the crank shaft 100 and is provided with a spring pressed detent 108 for engaging the recesses 104, 105 and 106 to locate the mechanism in the desired position. A cam 109 is formed on the arm 107 and is adapted to engage a plunger 110 which operates an electrical switch 111 for disconnecting the circuit of the starting motor during the starting and running positions of the mechanism.

The crank shaft 100 is provided with an arm 112 which corresponds to arm 72 in Figure 8. This arm is connected to a link 113 which is connected to a second link 114 through a bell crank lever 115. The other end of link 114 is connected to an arm 116 upon which a locking arm 117 is formed. This arm 117 is adapted to engage an arm 118 which operates a fuel pump control member 119 in order that operation of the pump may be prevented when the elements are in the position shown in Figures 14 and 15, corresponding to the cranking stage of operation of the engine.

When the crank shaft 100 is moved into the starting position, as indicated by the roman numeral II, the locking arm 117 is partially removed from the path of lever 118 and partial operation of the pump is permitted. Continued motion of the crank shaft 100 to the position indicated by roman numeral III enables full operation of the fuel pump to take place.

In the construction shown in Figures 18 through 22, a shaft 120 is provided with one or more eccentrics 121, the shaft being suitably journaled in supporting brackets 122 carried by the engine. The eccentric 121 serves as a cam which is boxed by means of spaced follower plates 123 and 124. These plates are carried by a reciprocable member 125 which is formed with a central chamber 126 within which the end of valve stem 127 is received. The valve stem is provided with a flange 128 within the chamber 126 against which a spring 129 seats. The other end of spring 129 is seated against a washer 130 which is carried upon the stem 127 and located by a nut 131. Rotation of shaft 120 is effected by means of a lever 132, a detent 132' and recesses 132'' being provided to locate the shaft in the desired positions.

It will be seen that motion of the valve stem during motion of the eccentric 121 from the position shown in Figure 20 to the position shown in Figure 21 is not very rapid, wheras, during motion of the eccentric from the position shown in Figure 21 to the position shown in Figure 22, the motion of the valve stem is relatively rapid.

In the construction shown in Figure 23, the valve stem 133 is provided with a tappet 134 against which a cam 135 is adapted to engage. The cam 135 is mounted upon a vertical spindle 136 which is provided with an arm 137 connected to a reciprocable operating rod 138. Axial motion of rod 138 may thus be properly effected to cause the cam 135 to move the valve stem 133 to the three positions by means of which the cranking, starting, and running phases of the engine may take place.

While the invention has been described with specific reference to the forms of the invention shown in the accompanying drawings, it is not to be limited, save as defined in the appended claims.

I claim:

1. Valve control mechanism for an air chamber of a Diesel engine having cranking, starting and running positions comprising a valve adapted to be moved into cranking, starting and running positions, a fitting having a central bore, a sleeve slidably mounted in the fitting, a cover on the sleeve, a first spring between the fitting and cover to urge the valve yieldingly in one direction and into one closed position, a valve stem on the valve slidably mounted in the sleeve, a second spring within the sleeve and between the valve stem and cover, and means to move the sleeve axially in another direction to seat the valve in another closed position through compression of the second spring, said means being adapted to hold the valve in an intermediate position.

2. Valve control mechanism for an air chamber of a Diesel engine having cranking, starting and running positions, comprising a valve adapted to be moved into cranking, starting and running positions, a fitting having a central bore, a sleeve slidably mounted in the fitting, a cover on the sleeve, a lost motion connection between the stem and the cover, a first spring between the fitting and cover to urge the valve yieldingly in one direction and into one closed position, a valve stem on the valve slidably mounted in the sleeve, a second spring within the sleeve and between the valve stem and cover, and means to move the sleeve axially in another direction to seat the valve in another closed position through compression of the second spring, said means being adapted to hold the valve in an intermediate position.

3. Valve control mechanism for an air chamber of a Diesel engine having cranking, starting and running positions comprising a valve adapted to be moved into cranking, starting and running positions, a fitting extending outwardly from the engine and having a central bore, a sleeve slidably mounted in the fitting, a cover on the sleeve, a first spring exteriorly of the fitting and between the fitting and cover to urge the valve yieldingly in one direction and into one closed position, a valve stem on the valve slidably mounted in the sleeve, a second spring within the sleeve and between the valve stem and cover, and means to move the sleeve axially in another direction to seat the valve in another closed position through compression of the second spring, said means being adapted to hold the valve in an intermediate position.

BRUNO LOEFFLER.